United States Patent [19]
Ploussious

[11] 3,911,437
[45] Oct. 7, 1975

[54] AIRCRAFT INSTRUMENT LANDING SYSTEM

[75] Inventor: George Ploussious, Andover, Mass.

[73] Assignee: Raytheon Company, Lexington, Mass.

[22] Filed: Jan. 21, 1974

[21] Appl. No.: 435,390

[52] U.S. Cl. .................. 343/108 M; 343/106
[51] Int. Cl.² ............................. G01S 1/44
[58] Field of Search ........... 343/108 M, 106 R, 102

[56] References Cited
UNITED STATES PATENTS
2,977,592   3/1961   Bruck .......................... 343/108 M
3,350,714   10/1967  Walker et al. ............... 343/108 M X

*Primary Examiner*—Maynard R. Wilbur
*Assistant Examiner*—Richard E. Berger
*Attorney, Agent, or Firm*—Richard M. Sharkansky; Philip J. McFarland; Joseph D. Pannone

[57] ABSTRACT

An aircraft instrument landing system is disclosed wherein elevation angle measurements of an aircraft are derived by providing, in such system, a means for inhibiting an elevation swept beam of radiation from sweeping through "low" angles where significant multipath transmission is expected. Means are provided to vary the power in the transmitted beam of radiation in a predetermined manner as the beam is inhibited from sweeping. As a result the radiation received by the low flying aircraft is shaped in a way related to the shape of the received radiation expected without multipath transmission. Such arrangement enables the same aircraft receiver and processor to determine the elevation angles of both "high" and low flying aircraft without appreciable error.

8 Claims, 8 Drawing Figures

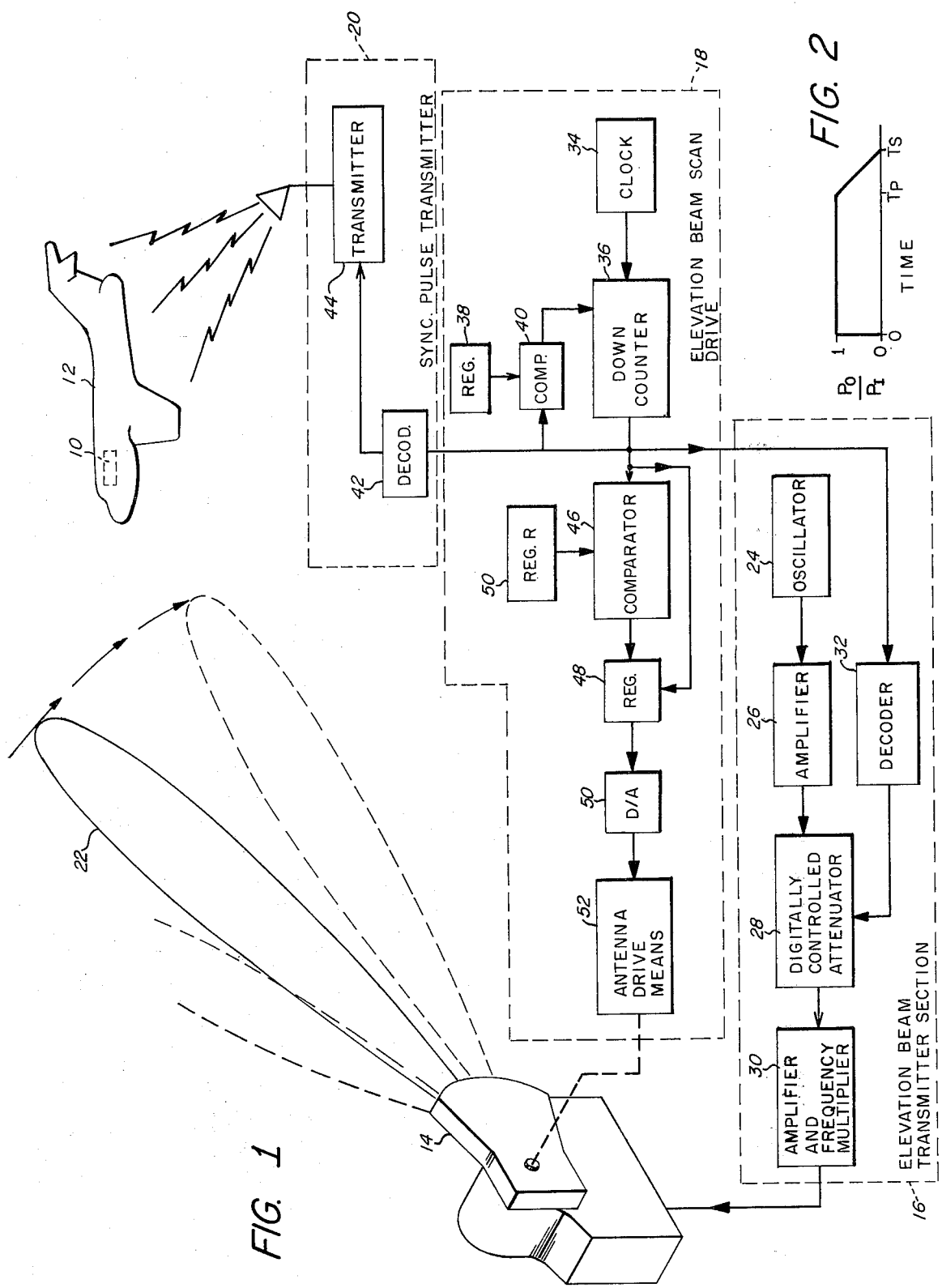

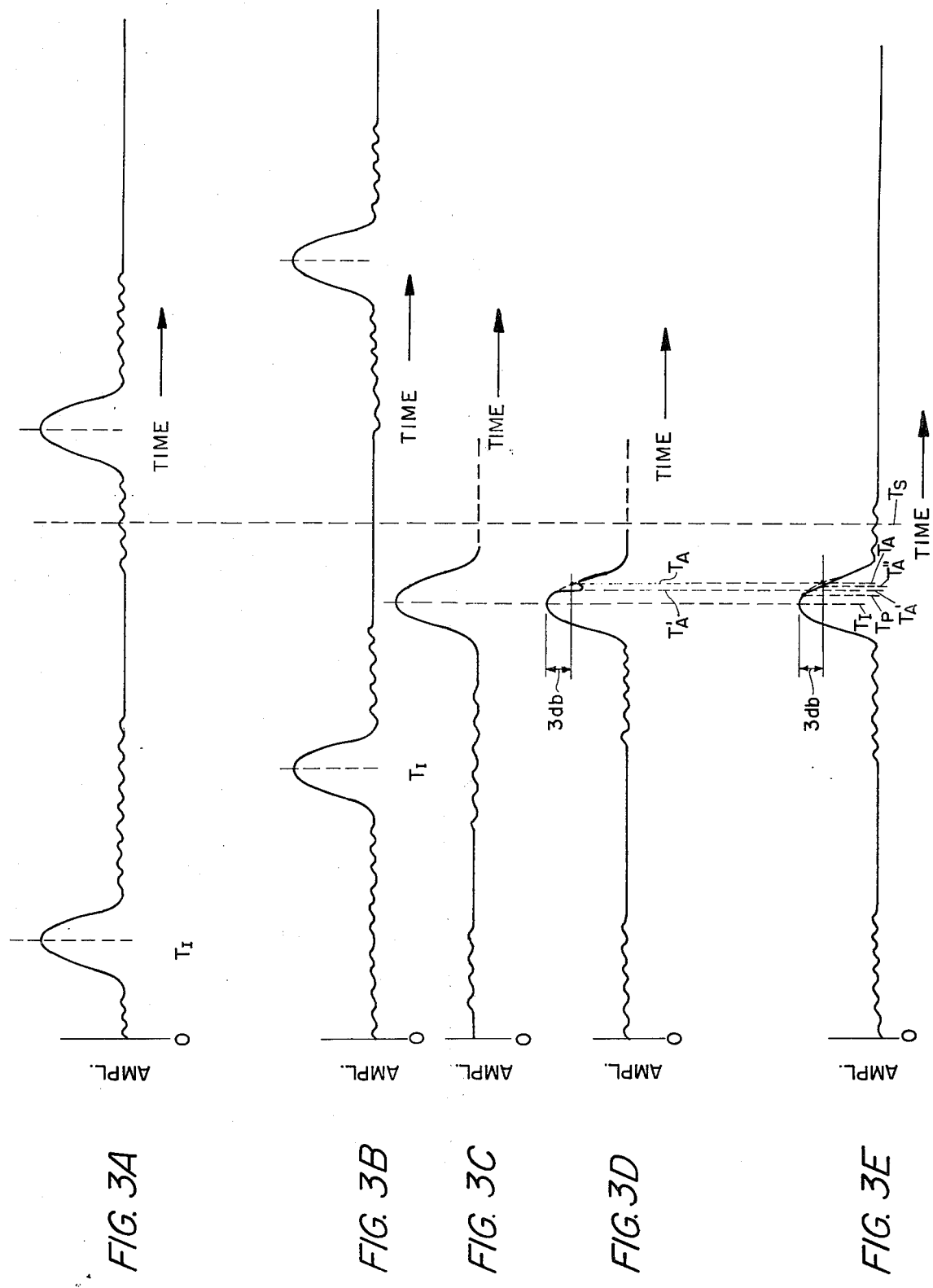

AIRCRAFT INSTRUMENT LANDING SYSTEM

BACKGROUND OF THE INVENTION

This invention relates generally to aircraft instrument landing systems.

As is known in the art, in many aircraft instrument landing systems azimuthal and elevation angle measurements of an aircraft may be derived by "time-reference" processing. In such processing a reference signal pulse is radiated from a ground station to cover an area to be scanned. A scanning directional beam of radiation originating at the ground station is started to sweep from a known direction when the reference pulse is radiated. Such beam is swept at a predetermined scan rate. The variations in radiation received at any point in space through which the scanning directional beam is swept are a replica of the transmitted beam pattern if the beam remains unperturbed during the sweep. It follows then that by knowledge of the scan rate, the direction, relative to a ground station, of the scanning directional beam when the sweep was started, and the time between reception of the reference signal pulse and of the greatest amplitude of the radiation in the scanning directional beam, an airborne receiver and processor may derive the angle between the initial direction of the scanning directional beam and the line of sight between the aircraft and the ground station. If the sweep is in elevation, the derived angle is analogous to elevation angle.

Because the shape of the scanning directional beam is generally flat near its center, the time measurement at which "beam center" passes through the aircraft is generally made indirectly. In particular, such measurement is calculated by determining the times at which the radiation passing through the aircraft is about 3 db lower than the maximum, and then assuming the time at which the beam center passed through the aircraft to be midway between such determined times.

In view of the foregoing it is apparent that the accuracy of an angle measurement using time - reference processing is related to the integrity of the beam shape of the scanning directional beam. Beam shape distortion is generally of major concern in measuring aircraft elevation at relatively low elevation angles when such beam irradiates portions of the ground or obstacles located at, or near, ground level. Any such irradiation may result in multipath transmission with a concomitant distortion of the received beam shape. In order to reduce the effect of multipath transmission, a relatively narrow scanning directional beam may be radiated from a large, expensive elevation antenna.

SUMMARY OF THE INVENTION

With this background of the invention in mind it is therefore an object of this invention to provide an improved aircraft instrument landing system.

It is another object of this invention to provide an improved aircraft instrument landing system wherein the effects of multipath transmission are reduced in such system for a given radiation beamwidth.

These and other objects of the invention are attained generally by providing, in an instrument landing system wherein a beam of radiation is periodically swept through various elevation angles, such beam of radiation being received by an aircraft during a portion of such sweep and processed to determine the elevation angle of such aircraft, the improvement including: Means for inhibiting such beam from being swept through elevation angles between the local horizontal and a predetermined elevation angle during each sweep period, and; means for varying, during each sweep period, the amplitude of the radiation in the transmitted beam in a predetermined manner during the time such beam is inhibited from being swept.

In a preferred embodiment the beam is inhibited from sweeping through relatively low elevation angles where excessive multipath transmission is expected. The level of the transmitted radiation during the time such sweep is inhibited is varied to enable aircraft receiver and processor to approximate the time at which the middle of the beam passes through such aircraft by measuring the times at which the received radiation passing through the aircraft is 3db below the maximum received radiation. The variation in the level of the transmitted radiation is related to the shape of the beam scanning through the relatively low elevation angles without multipath reception, thereby extending the usefulness of an aircraft processor to additional elevation angles.

BRIEF DESCRIPTION OF THE DRAWINGS

The foregoing features of this invention, as well as the invention itself, may be more fully understood from the following detailed description read together with the accompanying drawings, in which:

FIG. 1 is a sketch showing a portion of an aircraft instrument landing system incorporating the concepts of the invention;

FIG. 2 is a curve showing the relationship between the ratio of the output power ($P_o$) to input power ($P_i$) provided by a digitally controlled attenuator used in the landing system shown in FIG. 1 as a function of time;

FIGS. 3A to 3E are sketches showing the relationship between received radiation as a function of time under different conditions.

DESCRIPTION OF THE PREFERRED EMBODIMENT

Figure 4:
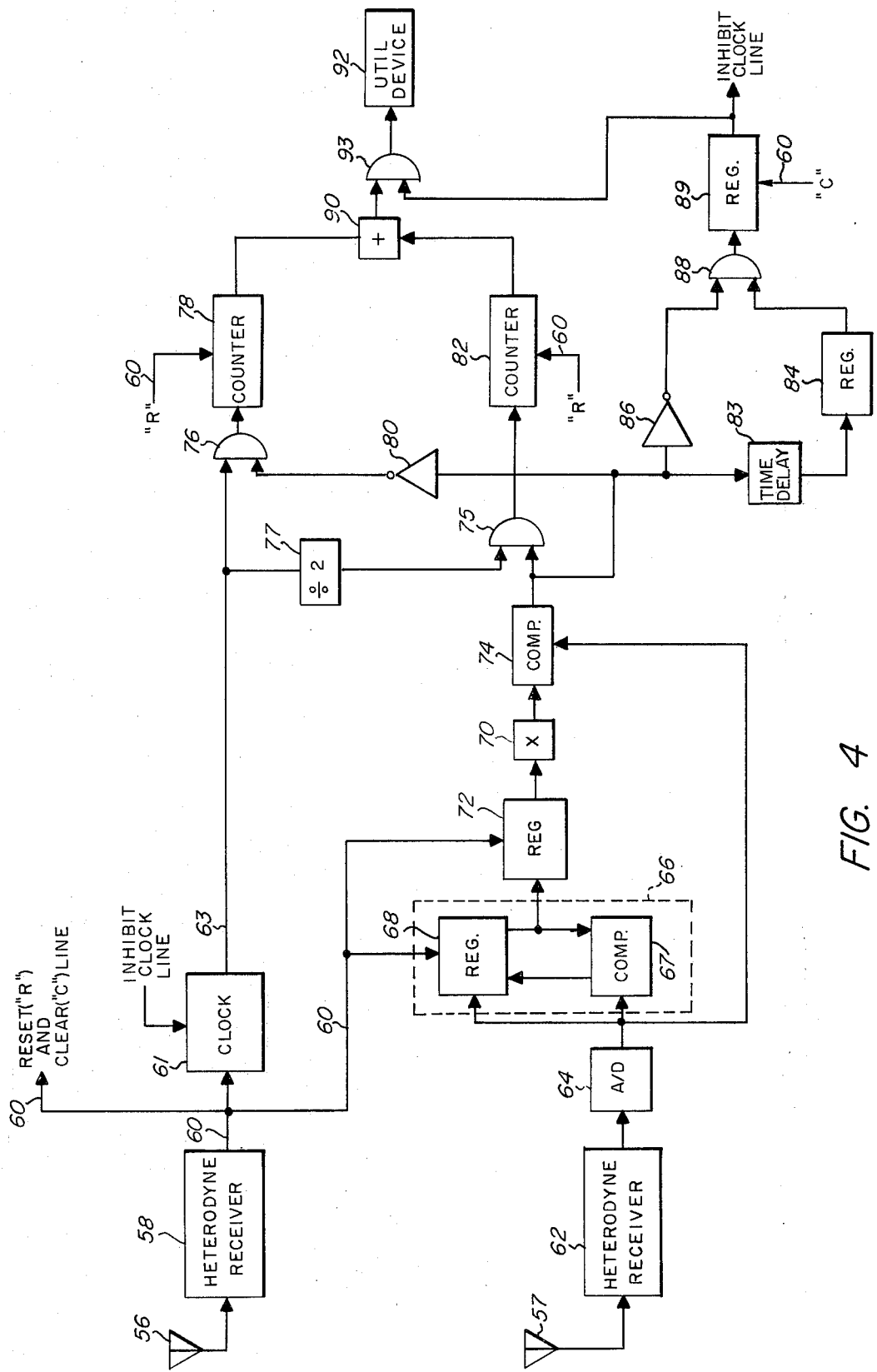
FIG. 4 is a schematic diagram of an aircraft receiver and processor used in the aircraft instrument landing system shown in FIG. 1.

Referring now to FIG. 1, a portion of an instrument landing system is shown, such being adapted to enable an aircraft receiver and processor 10 carried on board aircraft 12 to derive the elevation angle of such aircraft. The ground station for such system is shown to include an elevation antenna 14, an elevation beam transmitter section 16, an elevation beam scan drive 18 and a pulse transmitter 20, all arranged as shown in a manner to be described hereinafter.

Elevation antenna 14 is here adapted to transmit a beam of radiation 22 and periodically to sweep such beam in elevation. The direction of the sweep here is from a large elevation angle, say 90°, with respect to the horizon (i.e.0°). Radiation, then, is received by aircraft 12 during a portion of the elevation sweep, and processed by the receiver and processor 10 (along with a pulse from the pulse transmitter 20) to determine the elevation angle of such aircraft through time-reference processing.

The elevation beam transmitter 16 is shown to include a radio frequency oscillator 24, an amplifier 26, a digitally controlled attenuator 28 and an R.F. amplifier and frequency multiplier 30. The signal produced by oscillator 24 is amplified by the first amplifier 26 and the amplified signal produced by such amplifier is passed through amplifier and frequency multiplier 30 after the amount of power in such first amplified signal is adjusted in accordance with the attenuation factor produced by the digitally controlled attenuator 28. The control signals for such digitally controlled attenuator 28 are supplied by a decoder 32 in a manner to be described. As will become apparent hereinafter, the attenuation factor of the digitally controlled attenuator remains at constant, i.e. unity, from the start of each sweep until some predetermined time $T_p$. The time $T_p$ occurs at a time when the elevation angle antenna 14 reaches some predetermined angle $\theta_D$ (deg.) in each sweep. Therefore, if the scan rate of the elevation angle antenna is R(deg./sec), $T_p = (90° - \theta_D)/R$. After such time $T_p$ the digitally controlled attenuator 28 is here adapted to linearly decrease the ratio of the output power ($P_o$) thereof to the input power ($P_I$) thereof (i.e. ($P_o)/P_I$) as illustrated in FIG. 2, thereby linearly decreasing the power in the transmitted beam of radiation from elevation antenna 14. For reasons to become apparent it may be desirable to shape the $P_o/P_I$ relationship in accordance with the transmitted radiation beam shape.

Elevation beam scan drive 18 includes a clock 34 and a down counter 36 for counting the number of clock pulses supplied by such clock 34. A register 38 is provided to store a digital word representative of a zero elevation angle. A comparator 40 responds to the output of down counter 36 and the contents of register 38 to provide a reset signal to downcounter 36 when the output of such down counter is equal to the contents stored in register 38, that is, at a time $T_s = 90°/R$. It follows, then, that when a reset signal is supplied to down counter 36 such down counter is initiated and a digital word representative of the elevation angle at the commencement of each sweep (i.e. 90°) becomes stored therein. The down counter 36 is coupled to a decoder 42, such decoder providing a trigger signal for a conventional R.F. transmitter 44 when the down counter 36 indicates that the beam is at 90°. The transmitted frequency of the synchronizing pulse is different from the frequency of the beam of radiation. Therefore, at the start of each sweep a synchronizing pulse is transmitted by transmitter 44. Down counter 36 is also coupled to a comparator 46 and a register 48. A register 50 is also coupled to comparator 46 as shown. The register 50 has stored therein a digital word representative of the elevation angle above which multipath reception, that is, reflections of the beam 22 from portions of the ground or obstacles located at, or near, ground level, is minimal and below which significant multipath reception may be anticipated. Such angle is the predetermined angle $\theta_D$. When the output of down counter 36 is greater than the contents stored in register 50 an enabling signal is produced by comparator 46, such enabling signal being supplied to register 48 to allow the output of down counter 36 to be stored in register 48. The different digital words stored in register 48 as the output of down counter 36 changes are converted into analog signals by a conventional D/A converter 50. The output of the D/A converter 50 in turn controls an antenna drive means 52 to drive the elevation antenna 14 through its scanning path. When the contents of the register 50 and the down counter 36 are equal, comparator 46 operates to remove the enable signal from register 48 so that the contents of the latter cease changing. It follows then that the elevation angle antenna 14 may be swept at a constant rate through a scanning path until the predetermined angle $\theta_D$ is reached, at which time movement stops and the antenna remains at such angle $\theta_D$. The changing contents of down counter 36 are decoded by decoder 32 to provide control signals to the digitally controlled attenuator 28 as mentioned above. The latter, then, during the portion of the sweep period when the antenna 14 remains at the angle $\theta_D$, is effective linearly to decrease (as shown in FIG. 2) the radiation from such antenna 14 during the time period $T_p - T_s$.

Referring now to FIGS. 3A and 3B, time histories of radiation received by an aircraft receiver and processor 10 from scanning beam 22 (FIG. 1) are shown for a high elevation aircraft and a "medium" elevation aircraft, respectively. As the transmitted beam sweeps past either, received radiation is essentially a replica of the antenna pattern of such beam because multi-path transmission does not occur. The elevation angle of the aircraft may be determined using conventional time-reference processing. In such processing, as previously mentioned, the time between the start of the elevation sweep of the scanning beam 22 and the time at which the center of such beam passes through the aircraft $T_I$, is determined. That is, the time difference between the time of reception of a synchronizing pulse from pulse transmitter 20 and the time when the centerline of the scanning beam 22 is directed at the aircraft is measured on the aircraft. The elevation angle, $\theta_{EL}$, of the aircraft may then be calculated in a manner represented by the following equation: $\theta_{EL} = 90° - RT_I$. Because the scanning beam pattern is generally symmetrical and relatively flat near its center the time, $T_I$, is calculated by first determining the times during each sweep at which the received radiation is at a level 3db below the maximum level of such received radiation and then dividing the so determined interval in half.

The time-reference processing on the aircraft is performed by the aircraft receiver and processor 10 shown in detail in FIG. 4 and now to be described. The transmitted synchronizing pulse and the radiation in the scanning beam 22 are here adapted to be received by antennas 56 and 57, respectively, although a single antenna may be used. A conventional heterodyne receiver 58 is connected to antenna 56. Such receiver 58 is tuned to the frequency of the transmitted synchronizing pulse, thereby producing an enabling signal on line 60 in response to each transmitted synchronizing pulse. In response to each such enable signal, clock 61 is actuated, thereby producing a train of clock pulses at a frequency $f_1$ on line 63.

A conventional heterodyne receiver 62 is connected to antenna 57. Such receiver 62 is tuned to the frequency of the radiation in the scanning beam 22 to produce a corresponding video signal in each sweep when the scanning beam 22 is pointed toward the aircraft. As noted previously, the level of received radiation forms a replica of the pattern of the scanning beam 22 on each sweep. Each such video signal is here digitized by an A/D converter 64. A peak amplitude detector 66 is used to determine, in a manner now to be described, the maximum level of the radiation received by the scanning beam for each sweep. Thus the amplitude detector section 66 includes a comparator 67 and a register 68, one input of the former being the output of A/D converter 64 and the second input of the former being the output of the latter. Register 68 is adapted to store the output of A/D converter 64 when an enabling signal is produced by comparator 67. Such an enabling signal is produced by comparator 67 when the contents of register 68 are greater than the output of the A/D converter 64. The contents of register 68 are shifted in response to the enabling signal on line 60, to register 72. Register 68 then is reset at the beginning of each sweep. It follows, then, that the contents of register 68 will, assuming that the maximum level of the received radiation may not change materially between any two successive sweeps of the scanning beam 22, be representative of the maximum level of the received radiation in the scanning beam 22. A digital multiplier 70 is provided to multiply the contents of register 72 by a scale factor, here a scale factor of 0.707. The product signal is applied to a comparator 74. It follws, then, that the product signal represents the level of the received radiation of the scanning beam which is 3 db below the maximum received radiation level of such beam under the above-stated conditions and assumptions. Comparator 74 is provided to compare the level of the product signal with the currently produced output of A/D converter 64. When the output of A/D converter 64 is equal to, or greater than, the product signal an enabling signal is produced by comparator 74. The output of comparator 74 is coupled to a first input of gate 75. Gate 75 has a second input connected, as shown, to clock 61 through a frequency divider 77. Here such frequency divider 77 produces a train of pulses, the frequency thereof being one half the frequency of the train of pulses produced by clock 61.

In operation when each transmitted synchronizing pulse is received by heterodyne receiver 58, clock 61 is initiated to produce the train of clock pulses at frequency $f_1$ on line 63. Such clock pulses are applied to one input of a gate 76 and are, therefore, passed to a counter 78 when the just-mentioned gate is enabled. Counter 78 is reset by each enable signal on line 60. The second input to gate 76 is derived from an inverter 80 which, in turn, is actuated by the output of comparator 74. It may be seen, therefore, that inverter 80 produces an enabling signal for gate 76 at all times except when comparator 74 produces an enabling signal for gate 75. It follows, then, that during each sweep of the scanning beam 22 the maximum count in counter 78 is representative of the angular separation between the direction of the scanning beam 22 at the beginning of each sweep and the direction of such beam when the first "−3db" level of received radiation is detected.

As long as the output of comparator 74 is indicative of the fact that the level of the received radiation in the scanning beam 22 is equal to, or greater than, −3db of the maximum level of received radiation, gate 75 is enabled so that the output of the frequency divider 77 is passed to a counter 82. With the latter reset to zero by each received synchronizing pulse and the frequency of the clock pulses divided in half, it may be seen that the maximum count in the counter 82 is representative of the angular separation between the direction of the scanning beam 22 when the first −3db level of received radiation was detected and the direction of the center of the scanning beam 22 when such center passes through the aircraft. This is so because gate 75 is inhibited when the second −3db of the scanning beam 22 passes through the aircraft.

It is necessary to prevent clock pulses from reaching either counter 78 or counter 82 after each has reached its maximum count during any sweep of the scanning beam 22. To accomplish such an end, each enabling signal out of comparator 74 is passed, via a time delay 83, to a register 84 and to an inverter 86. It may be seen, therefore, that a gate 88 is enabled to pass a pulse to a register 89 only when comparator 74 is changed from its condition of producing an enabling signal for gate 75 to its condition of inhibiting such gate. Register 89 is coupled to clock 61 and, until cleared by the next following received synchronizing pulse, serves to inhibit generation of any clock pulses so the count or contents of counters 78, 82 remain unchanged until the two are reset as previously described.

The contents of counters 78 and 82 are added in a digital adder 90. When a gate 93 is enabled the output of digital adder 90 is representative of the angular separation between the direction of the scanning beam 22 at the start of each sweep and the direction of such beam when its center line is directed at the aircraft. The gate 93 is, as shown, enabled during each sweep when register 89 stores a binary "1". The sum of the maximum contents of counters 78, 82 is appropriately scaled and processed by utilization device 92 in accordance with the equation: $\theta_{EL} = 90° - RT_I$. Utilization device 92 here includes a suitable display (not shown) for displaying the calculated elevation angle, $\theta_{EL}$.

It is noted that the utilization device 92 displays the elevation angle, $\theta_{EL}$, associated with two successive sweeps. The first indication by the utilization device will perhaps be in error; however, any such error will be corrected on the next sweep. Thereafter the indication is correct.

Referring now to FIG. 3C, the time history of radiation received from the scanning beam 22 at the aircraft is shown for a low elevation aircraft under the assumption that there is no multipath transmission and that the scanning beam is not inhibited from scanning to the horizon. In such a case there is no difference in operation from that described hereinbefore.

Referring now to FIG. 3D, an exemplary time history of received radiation for such low elevation aircraft is shown with the assumptions that there is multipath transmission and that the beam is swept to the horizon. It is noted that multipath transmission has the effect of distorting the pattern of received radiation so that such received radiation is not a replica of the scanning beam 22, here shown dotted. Consequently, the processing technique described above would produce an incorrect determination of the time at which the center of the beam of radiation passes through the aircraft (i.e. $T_I$). In particular, the processor 10 would determine that the time at which the level of the received radiation reached a level 3db below the level of the maximum received radiation would be the time $T'_A$ rather than time $T_A$.

Referring now to FIG. 3E, an exemplary time history of the radiation received from the scanning beam 22 by the low elevation aircraft is shown using the instrumentation landing system according to the invention and the apparatus described in connection with FIGS. 1, 2 and 4. In such system, as has been previously mentioned, the scanning beam is not scanned to the horizon but is inhibited from scanning below a predetermined angle, $\theta_D$, at a time $T_p$ after the start of the sweep. Because the power in the transmitted beam of radiation is reduced in accordance with the signals provided to digitally controlled attenuator 28 (FIG. 1) the received radiation after time $T_D$ falls off as indicated by the solid curve in FIG. 3E. The dotted curve in FIG. 3E represents the received radiation under the assumptions made in connection with FIG. 3C and the solid curve represents the actually received radiation. It is first noted that because the beam sweep is inhibited from angles less than $\theta_D$, there will be substantially no multipath reception for reasons mentioned above. Further, the shape of the received radiation will be, to at least a first approximation, substantially equivalent to the radiation expected to be received by such low elevation aircraft in the absence of multipath reception. That is, the time at which the 3db level is reached is indicated as $T''_A$. This enables the receiver and processor 10 to compute, as previously described, the elevation angle for a low elevation aircraft without appreciable error. The degree of approximation is related to the shape of the beam of radiation and the $P_o/P_I$ vs. time relationship provided by the digitally controlled attenuator between the time $T_P$ and the time $T_s$. Therefore, it follows that a nonlinear $P_o/P_I$ vs. time relationship which is related to the nonlinear shape of the beam of radiation may be used instead of the linear relationship described above.

It is noted that the elevation antenna 14 may be a phased array antenna and the drive means 52 may be the beam steering computer for use with such phased array antenna.

Further, while a time-reference processing scheme has been described, other schemes may be used such as a frequency coded scheme wherein the frequency of the transmitted beam of radiation is linearly varied in accordance with the angular position of the beam over the scan. In such scheme the elevation angle of an aircraft is determined by measuring the frequency of the received radiation when the level of such radiation is maximum. Still further, while a 3 db processor has been described, other processors may be used, such as a "centroid" processor.

Having described a preferred embodiment of this invention, it is now evident that other embodiments incorporating its concepts may be used. It is felt, therefore, that the invention should not be restricted to its disclosed embodiments, but rather should be limited only by the spirit and scope of the appended claims.

What is claimed is:

1. In an instrument landing system wherein an antenna system transmits a beam of radiation periodically swept through various elevation angles, a portion of such radiation being received by an aircraft during a portion of such sweep and being processed to determine the elevation angle of such aircraft, the improvement comprising:
   a. means for inhibiting such beam from being swept through elevation angles between the local horizontal and a predetermined elevation angle during each sweep period; and
   b. means for varying, during each sweep period, the amplitude of the radiation in the transmitted beam in a predetermined manner during the time such beam is inhibited from being swept through elevation angles between the local horizontal and the predetermined elevation angle.

2. The improvement recited in claim 1 including additionally a processor for determining the time at which the radiation received by the aircraft is at a maximum level.

3. The improvement recited in claim 2 wherein the processor includes:
   a. means for supplying a pair of pulse trains, one of such pair having a frequency f and the other one of such pair having a frequency ½ f, and
   b. means for counting the number of pulses in the pulse train having a frequency f during the time interval from the commencement of such sweep to the time at which the level of the received radiation is a predetermined level below the maximum level of such received radiation and for counting the number of pulses in the pulse train having a frequency ½ f during the time interval in such sweep when the received radiation is greater than such predetermined level.

4. The improvement recited in claim 1 including: Means for providing signals representative of various elevation angles during the sweep period; and, means, responsive to such signals, for adjusting the power transmitted by the beam of radiation in accordance with such signals.

5. The improvement recited in claim 4 including additionally means for transmitting a pulse at a predetermined time during each sweep and the processor includes means for receiving such pulse to determine the time interval between the reception of such pulse and the maximum level of the received radiation.

6. In combination:
   a. means for sweeping a beam of radiation through various angles during a portion of a sweep period and for inhibiting the beam of radiation from being swept through elevation angles between a local horizontal and a predetermined elevation angle during another portion of such sweep period; and
   b. means for varying the amplitude of the radiation in the transmitted beam of radiation in a predetermined manner during the time such beam is inhibited from being swept.

7. The combination recited in claim 6 including means, responsive to the beam of radiation, for determining the angle of the swept beam when such means responds to the center of such radiation.

8. The combination recited in claim 7 wherein the determining means includes:
   a. means for supplying a pair of pulse trains, one of such pair having a frequency $f$ and the other one of such pair having a frequency ½ $f$; and
   b. means for counting the number of pulses in the pulse train having a frequency $f$ during the time interval between the response of the determining means to an enabling signal and the time at which the level of the received radiation is a predetermined level below the maximum level of such received radiation and for counting the number of pulses in the pulse train having a frequency ½ $f$ during the time interval in the sweep when the received radiation is greater than such predetermined level.

* * * * *

UNITED STATES PATENT OFFICE
CERTIFICATE OF CORRECTION

Patent No. 3,911,437     Dated October 7, 1975

Inventor(s) George Ploussios

It is certified that error appears in the above-identified patent and that said Letters Patent are hereby corrected as shown below:

Inventor's name should read -- George Ploussios --.

Signed and Sealed this

Nineteenth Day of October 1976

[SEAL]

Attest:

RUTH C. MASON
*Attesting Officer*

C. MARSHALL DANN
*Commissioner of Patents and Trademarks*